(12) United States Patent
Frankel et al.

(10) Patent No.: US 7,396,499 B2
(45) Date of Patent: Jul. 8, 2008

(54) MULTIPLE LAYERED MEMBRANE WITH FLUORINE CONTAINING POLYMER LAYER

(76) Inventors: Thomas E Frankel, 4 Tucker Dr., c/o SSI, Poughkeepsie, NY (US) 12603; Seoung-il Kang, 4 Tucker Dr., c/o SSI, Poughkeepsie, NY (US) 12603; Todd David Ritter, 4 Tucker Dr., c/o SSI, Poughkeepsie, NY (US) 12603; Hong-suk Kim, Dong Won Apartment 106-501, Jung Wang Dong, Shihung City (KR)

( * ) Notice: Subject to any disclaimer, the term of this patent is extended or adjusted under 35 U.S.C. 154(b) by 435 days.

(21) Appl. No.: 10/711,607

(22) Filed: Sep. 28, 2004

(65) Prior Publication Data

US 2005/0003204 A1    Jan. 6, 2005

(51) Int. Cl.
*B29C 43/20*    (2006.01)
(52) U.S. Cl. ............... 264/236; 264/248; 264/275; 264/347

(58) Field of Classification Search ............... 264/236, 264/402–403, 347, 345, 250, 642, 109, 112; 428/421; 210/626; 585/431
See application file for complete search history.

(56) References Cited

U.S. PATENT DOCUMENTS

| | | | | |
|---|---|---|---|---|
| 4,668,460 A | * | 5/1987 | Ongena | 264/255 |
| 5,998,034 A | * | 12/1999 | Marvil et al. | 428/422 |
| 6,074,719 A | * | 6/2000 | Fukushi et al. | 428/36.9 |
| 6,077,609 A | * | 6/2000 | Blong et al. | 428/412 |
| 6,133,373 A | | 10/2000 | Kirochko et al. | |
| 6,197,393 B1 | * | 3/2001 | Jing et al. | 428/35.9 |
| 6,596,357 B1 | | 7/2003 | Marvil et al. | |
| 6,753,087 B2 | * | 6/2004 | Jing et al. | 428/421 |
| 6,759,120 B2 | | 7/2004 | Jongill et al. | |
| 6,759,129 B2 | * | 7/2004 | Fukushi | 428/412 |
| 6,794,027 B1 | | 9/2004 | Araki et al. | |
| 2003/0129383 A1 | * | 7/2003 | Yamamoto et al. | 428/317.7 |
| 2004/0091713 A1 | * | 5/2004 | Suwa et al. | 428/421 |
| 2005/0155690 A1 | * | 7/2005 | Park | 156/60 |

* cited by examiner

*Primary Examiner*—Edmund H. Lee
(74) *Attorney, Agent, or Firm*—Aziz M. Ahsan; Ahsan + Associates PLLC

(57) ABSTRACT

A multi-layer article includes a fluoropolymer layer and a substrate which are joined permanently through a multi-step cross-linking technique.

18 Claims, 2 Drawing Sheets

MULTIPLE LAYERED MEMBRANE WITH FLUORINE CONTAINING POLYMER LAYER

FIELD OF THE INVENTION

This patent applies to the cross-linking of a thin film layer 0.3 or less uncured Fluoroelastomer, typically comprised of a copolymer of of vinylidene fluoride and hexafluoropropylene or terpolymers of vinylidene fluoride, hexafluoropropylene and tetrafluoroethylene, onto a substrate such as EPDM (ethylene-propylene-diene monomer) or Nitrile rubber to improve upon the substrate's physical and chemical resistance properties. This method is especially interesting in applications where temperature or chemical resistance properties of a fluoroelastomer are favored, but the physical properties of a different material are required. A clear example of this is the waste water aeration market, where flexible EPDM membranes having desirable physical properties but lackluster chemical resistance may now be layered with a flexible fluoroelastomer to inhibit substrate material degradation.

BACKGROUND OF THE INVENTION

There are existing methods to bond fluoroelastomers to substrate materials such as EPDM and Nitrile. However these methods have not proven successful in applications where the material is subject to significant stress, such as bending, perforating, doming, and stretching. In the waste water aeration market, for example, membranes are perforated and continuously stretched and flexed. The method of connecting multiple layers must be a strong and permanent one to survive this kind of application.

It is well known that monopolymeric rubber membranes made non fluoroelastomers lack desirable chemical and physical properties of fluoroelastomers such as temperature resistance, mechanical and physical functions, and chemical resistance.

Likewise fluoroelastomers are limited in elongation, flexibility, strength, modulus, hardness and other physical properties.

Therefore the ideal combination adopts the desirable characteristics of both fluoroelastomers and non fluoroelastomers.

One specific example of an application for this technology is in the diffused aeration business, where perforated rubber membranes, submerged in either chemical or municipal waste water, are flexed continuously in order to produce a multitude of fine bubbles. The fine bubbles transfer oxygen efficiently from gas to liquid phase. Such membranes traditionally have been subject to attack by wastewater contents which are relatively common, such as fats, oils, greases, aromatic hydrocarbons, calcium carbonate deposits on the water side of the membrane, and ozone or oxygen attack on the air side of the membrane. Through the use of a multiple layered membrane it is possible to maintain the well established physical properties of today's EPDM membranes while adding a protective fluoroelastomer shield at an economical cost.

SUMMARY

It has been documented in U.S. Pat. No. 6,759,129 that a fluoropolymer layer may be bonded to a second layer through the aid of a fluoroelastomer bonding solution. However we have proven that it is not necessary to use a bonding agent to attach thin fluoroelastomer film to a substrate such as EPDM or Nitrile rubber through the use of a three stage cross linking method.

Through the use of the three stage cross linking method it is possible to form a permanent bond directly between the thin fluoroelastomer film layer and the substrate layer which can withstand significant stretching, perforating, and flexing of the joined article without failure.

DETAILED DESCRIPTION

Adhesion between multiple polymer layers where a thin fluoroelastomer film 1 is joined with a substrate 2 is accomplished in a novel way through a three step molding process.

As a first step, a substrate layer such as membrane 2 is pre-cured to an incomplete state of cure at a temperature of 75 to 150 degrees C. in a mold base 4.

Figure 1:
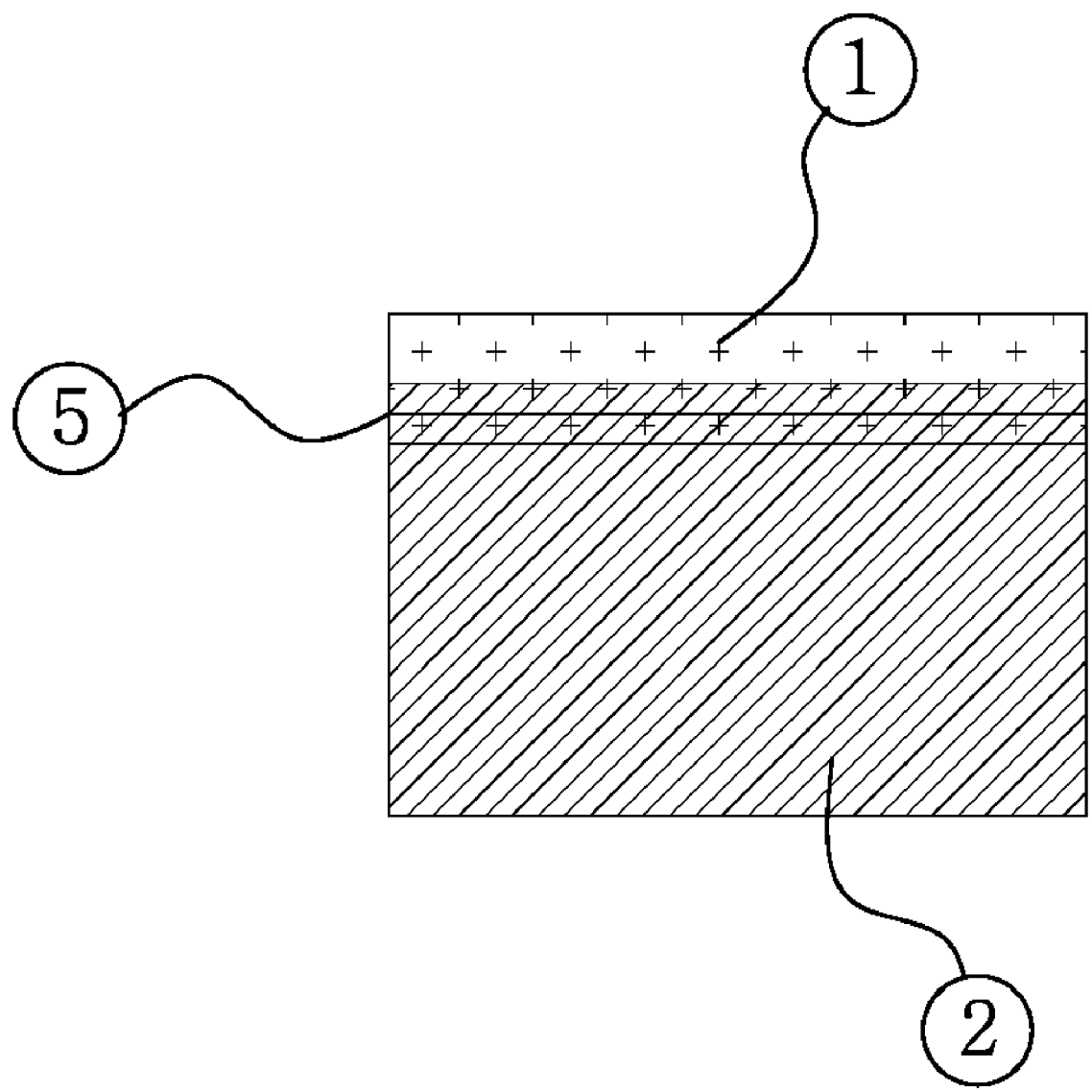
FIG. 1 is a cross sectional view of a multi-layer article.
Figure 2:
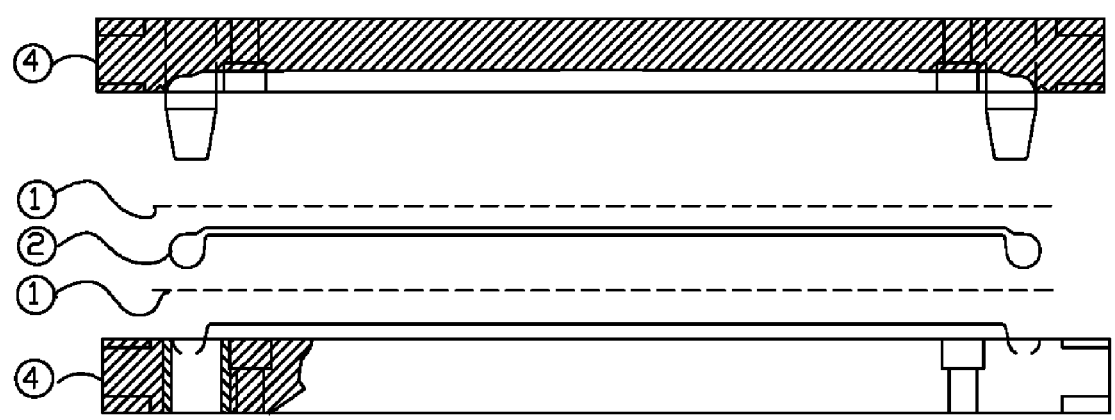
FIG. 2 is a cross sectional view of a compression mold base with a membrane onto which layers are being applied.
Figure 3:
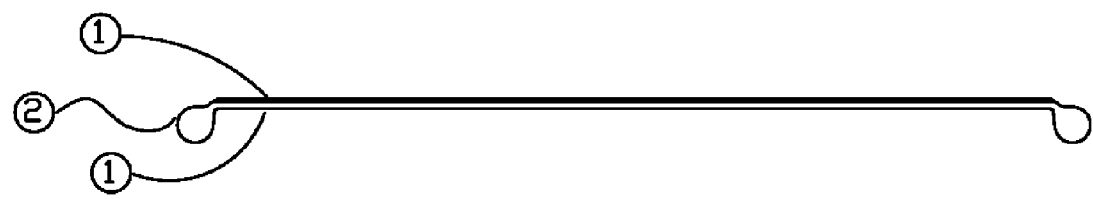
FIG. 3 is a cross sectional view of a membrane onto which layers have been applied.

As a second step, an uncured thin fluoroelastomer film 1 of less than or equal to 0.3 mm is placed on the substrate layer 2 and the layers are cured together in the mold 4 at a temperature of 150 to 250 degrees C. The short exposure to high temperatures necessary to cure fluoroelastomers quickly cross links the fluroelastomer layer to the substrate layer without harming the substrate. Referring to FIG. 1, article 5 is the cross linked zone between substrate and thin fluoroelastomer film.

As a third step, the joined article is removed from the mold base 4 and placed into an autoclave at a temperature of 100 to 180 degrees C. where the state of cure of the substrate material is raised to 90-95%.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A process for preparing a multi-layer article, comprising the steps of:
    (a) placing a substrate in a mold, and wherein said substrate alone is first pre-cured to an incomplete state of cure in said mold at a temperature of 75 to 125 C.
    (b) an uncured fluoroelastomer layer of up to about 0.3 mm thickness is placed on said pre-cured substrate of step (a) and said layers are cured together in said mold at a temperature of 150 to 225 C to form an intermediate article, and
    (c) removing said intermediate article of step (b) from said mold and curing it in an oven at a temperature of 100 to 150 C such that the cross linking of the layers forms a permanent bond between said substrate and said fluoroelastomer layer and thereby forming said multi-layer article.

2. The process of claim 1, wherein said fluoroelastomer layer is a copolymer derived from a monomer selected from the group consisting of tetrafluoroethylene, vinylidene fluoride, hexafluoropropylene and an olefinic hydrocarbon.

3. The process of claim 2, wherein said olefinic hydrocarbon is selected from a group consisting of ethylene and propylene.

4. The process of claim 1, wherein said substrate is selected from the group consisting of a non-fluorinated polymer or a metal.

5. The process of claim 4, wherein the non-fluorinated polymer is selected from a group consisting of nitrite rubbers, ethylene-propylene-diene monomer rubbers, epichlorohydrin rubbers, ethylene-acrylate copolymer rubbers, polyamides, polyurethanes, polyolefins, and combinations thereof.

6. The process of claim 1, wherein said fluoroelastomer layer comprises a monomer segment derived from an olefinic hydrocarbon.

7. The process of claim 4, wherein said non-flourinated polymer is selected from a group consisting of a thermoplastic polymer and a thermoplastic elastomer.

8. The process of claim 1, wherein said fluoroelastomer layer is selected from a group consisting of a fine bubble diffuser membrane and a coarse bubble diffuser membrane.

9. The process of claim 1, wherein said fluoroelastomer is a fluoroplastic.

10. A process for preparing a multi-layer article, comprising the steps of:
  (a) placing a substrate in a mold, and wherein said substrate alone is first pre-cured to an incomplete state of cure in said mold at a temperature of 75 to 125 C.
  (b) an uncured fluoroelastomer layer of up to about 0.3 mm thickness is placed on said pre-cured substrate of step (a) and said layers are cured together in said mold at a temperature of 150 to 225 C to form an intermediate article, and
  (c) removing said intermediate article of step (b) from said mold and curing it in an oven at a temperature of 100 to 180 C such that the cross linking of the layers forms a permanent bond between said substrate and said fluoroelastomer layer and thereby forming said multi-layer article.

11. The process of claim 10, wherein said fluoroelastomer layer is a copolymer derived from a monomer selected from a group consisting of tetrafluoroethylene, vinylidene fluoride, hexafluoropropylene and an olefinic hydrocarbon.

12. The process of claim 11, wherein said olefinic hydrocarbon is selected from a group consisting of ethylene and propylene.

13. The process of claim 10, wherein said substrate is selected from a group consisting non-fluorinated polymer and a metal.

14. The process of claim 13, wherein said non-fluorinated polymer is selected from a group consisting of nitrite rubbers, ethylene-acrylate copolymer rubbers, epichlorohydrin rubbers, ethylene-acrylate copolymer rubbers, polyamides, polyurethanes, polyolefins, and combinations thereof.

15. The process of claim 13, wherein said non-fluorinated polymer is selected from a group consisting of a thermoplastic polymer and a thermoplastic elastomer.

16. The process of claim 10, wherein said fluoroelastomer layer is selected from a group consisting of a fine bubble diffuser membrane and a coarse bubble diffuser membrane.

17. The process of claim 10, wherein said fluoroelastomer layer comprises a monomer segment derived from a olefinic hydrocarbon.

18. The process of claim 10, wherein said fluoroelastomer is a fluoroplastic.

\* \* \* \* \*